March 22, 1955  G. M. EAMES ET AL  2,704,804
VANITY APPLIANCES
Original Filed Dec. 27, 1949

Inventor:
GEORGE M. EAMES &
MARJORIE G. EAMES

By *[signature]*
Attorney

United States Patent Office 2,704,804
Patented Mar. 22, 1955

2,704,804

VANITY APPLIANCES

George M. Eames and Marjorie G. Eames, Albany, N. Y.

Substituted for abandoned application Serial No. 135,248, December 27, 1949. This application August 7, 1951, Serial No. 240,712

8 Claims. (Cl. 240—6.45)

This invention relates to improvements in vanity appliances, and more particularly to a combination holder for a cosmetic, a mirror and an illuminating means for enabling the application of the cosmetic in dark or in poorly lighted places. Such a combination appliance will be hereinafter described as a lipstick applying device, but it will be understood that such application is illustrative as the device of the invention may be used in applying other cosmetics, such as rouge, face powder, etc.

A principal object of the invention is the provision of an improved and effective vanity appliance in the form of a lipstick applying device which is capable of daytime use as usual, and which moreover incorporates a self-contained source of illumination enabling its effective use at nighttime and without resort to other sources of illumination.

Another object of the invention is the provision of a lipstick applying device which combines into a unitary, self-contained structure a lipstick holder, a mirror and an illuminating means which enables the use of the mirror in dark or poorly lighted places, in which said components are so organized and related that the device as a whole takes up a small amount of space, and has such form that it may be readily carried about in a ladies' handbag or similar receptacle.

Yet another object of the invention is the provision of a novel arrangement of a lipstick holder, mirror and self-contained illuminating means for directing light on to the lips or other feature to be made up, wherein the lipstick holder and illuminating means are disposed within a tubular barrel or shell having the approximate dimentions of the conventional fountain pen, the barrel incorporating a reflector adapted to direct light rays at right angles to the axis of the barrel through a suitable cut-out therein and thence to the lips, the barrel also mounting the mirror in suitable position that it receives the reflection of the illuminated lips.

A still further object of the invention is the provision of a lipstick applying device incorporating a flash-light battery and lamp bulb, characterized by a novel and effective means for completing the lamp circuit which eliminates the relatively complicated switch means heretofore employed to complete the lamp circuit of a flashlight and thereby simplifies manufacture and reduces assembly costs of the device as a whole.

Other objects and advantages of the invention will become apparent from the following detailed description thereof, taken in conjunction with the drawing, in which—

Figure 1:
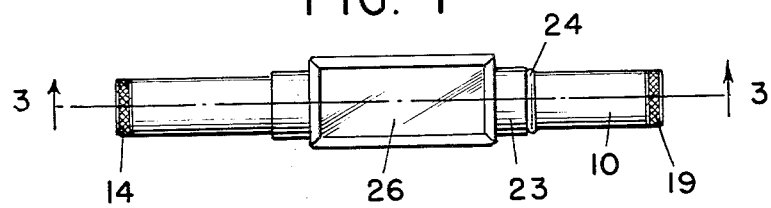
Fig. 1 is a side elevation of a lipstick device according to the invention, the mirror being shown in position for normal daytime use of the device.

Referring to the drawings wherein like reference numerals designate like parts throughout the several views, reference numeral 10 designates a tubular shell or barrel, preferably of circular section and having length and diameter approximately that of the barrel of a conventional fountain pen. Housed in one end of the barrel is a drycell or dry battery 11, which is spring-pressed against an internal shoulder 12 by a spring 13 of conductive material which is reactive between the negative terminal of the battery and a removable closure cap 14 which grounds the battery to the barrel 10. The other end of the barrel provides a tubular compartment for a lipstick or similar cosmetic holder generally designated 16, which may be of the type in which the lipstick designated 17 is projected from its shell 18 by rotation of an end cap 19. It is understood that the lipstick holder is freely insertible into and removable from its end of the barrel, and, when so inserted, it will not accidentally become separated from the barrel. Preferably, the inner end of the lipstick compartment is closed off from the remaining length of the barrel interior by a disk 20 secured in place as shown by any suitable means.

Figure 2:
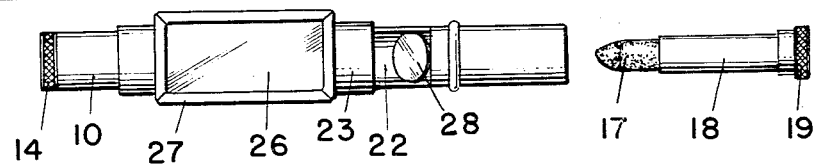
Fig. 2 is a separated view illustrating the lipstick holder withdrawn from the device, and the mirror shifted to position enabling use of the device in the dark.
Figure 4:
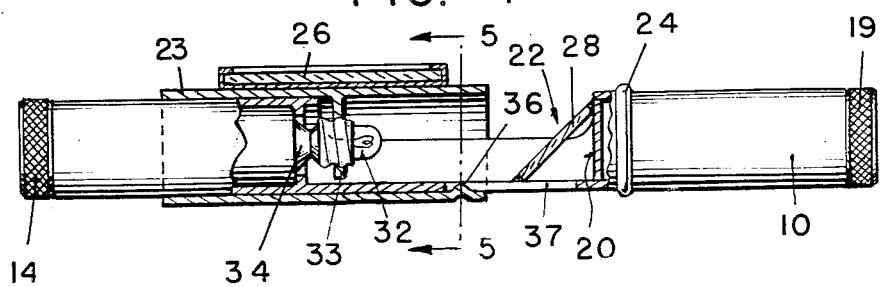
Fig. 4 is a partial longitudinal section illustrating interior construction and the relation of parts when the device is set up for use as in Fig. 2; and—
Figure 5:
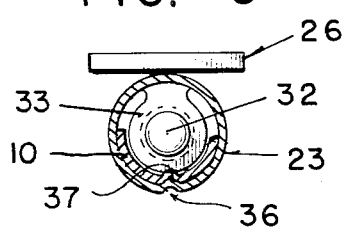
Fig. 5 is a section taken along line 5—5 of Fig. 4.

Intermediate the internal shoulder 12 which locates the dry cell 11 and the aforesaid closure disk 20, the barrel is provided with a semi-cylindrical cut-out providing an elongated opening 22, correspondingly shaped, in the barrel side wall. A sleeve 23 mounted externally of the barrel and sliding thereon is adapted in its normal right-end position, in which it abuts against an external bead 24 rolled or otherwise provided in the barrel, to cover the opening 22. However, when the sleeve is moved axially along the barrel to the left, it exposes said opening 22 for a portion of its length, as seen in Figs. 2 and 4. The sleeve mounts a mirror 26 which may be secured in position on the sleeve in any approved manner, as by welding or soldering the mirror frame 27 or its mounting bracket directly to the sleeve, it being understood that other means for affixing the mirror to sleeve may be employed.

Mounted within the cut-away portion of the barrel 10 and beneath the portion of the barrel opening 22 that is exposed upon leftwise movement of the sleeve 23 is a reflector 28 which, by reference to Fig. 4 in particular, is inclined so as to direct light rays traveling in axial direction along the barrel at substantially right angles to said axis and thence radially outwardly through the exposed portion of the opening. The reflector 28 is securely anchored in the solid half of the barrel as by welding or soldering the reflector frame to the interior surface of the barrel and to the disk 20 which closes off the lipstick holder compartment.

Figure 3:
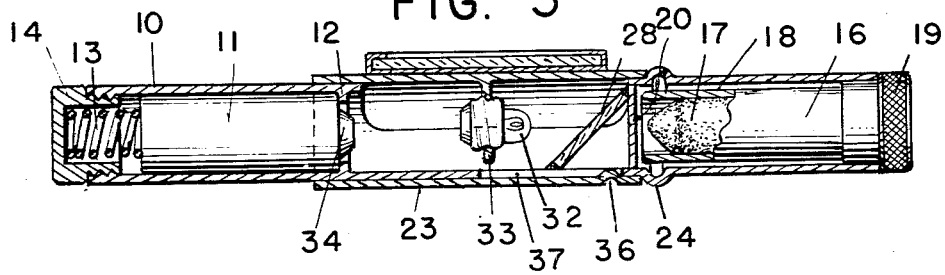
Fig. 3 is a longitudinal section taken along line 3—3 of Fig. 1.

An important feature of the invention resides in the provision of novel means for energizing a flash lamp bulb 32 from the battery 11. Referring to Figs. 3 and 4, the sleeve 23 has affixed thereto an inwardly directed arm 33 which depends into the barrel interior through the opening 22 therein. The arm is provided with an axial opening which may be formed with a thread to receive the threaded plug-end of the lamp bulb, and accordingly the bulb is bodily movable with the sleeve. By locating the arm 33 in the middle length portion of the sleeve, it will be seen that the bulb is well spaced from the positive terminal 34 of the battery when the sleeve is in its normal or right-end position shown in Figs. 1 and 3, and hence the bulb is normally de-energized. However, when the sleeve is shifted to the left to expose opening 22, the lamp terminal engages the positive terminal 34 of the battery, and a circuit from battery through bulb to ground is completed, resulting in the bulb being energized, the aforesaid engagement also limiting the leftwise movement of the sleeve. Light rays emanating from the lamp bulb travel in generally axial direction until they impinge upon the reflector 28 which directs them outwardly. It will be observed that opening and closing of the lamp circuit through movement of sleeve 23 as aforesaid eliminates the relatively complicated switch mechanism usually employed to close a flash-light circuit, this feature having the advantage of simplifying construction of the device as a whole, as well as of reducing manufacturing and assembly costs.

Suitable means are provided to prevent free rotation of sleeve 23 and mirror 26 relative to barrel 10 without interfering with the sliding movement of the sleeve. Referring to Fig. 4, such may comprise an inwardly directed key or pin 36 pressed into or otherwise formed in the sleeve 23 and a groove 37 pressed into the external surface of the barrel 10, the pin traveling along the groove. Due to the confining action of the side walls of the groove, the sleeve is restrained against rotary movement but of course is free to slide axially for the length of the groove.

It will be seen that the device described in the foregoing combines into a simple, compact structure a holder for a lipstick or other form of cosmetic, a mirror, and means for illuminating the lips or other features to be made up, thus enabling use of the mirror in dark or poorly lighted places. For daytime use of the device, the sleeve 23 and mirror 26 carried thereby is positioned as shown in Fig. 1, the sleeve closing the opening 22 and also effecting opening of the circuit of the illuminating means. The lipstick holder may be easily withdrawn from the right end of the barrel, which latter is held in the left hand, whereupon the lipstick may be applied as usual, resort being had to the mirror to insure its proper application.

For use in dark or poorly lighted surroundings, the sleeve 23 is shifted to the left until the terminal of the lamp bulb 32 engages the positive terminal 34 of the battery, this movement effecting partial exposure of opening 22. Light rays from bulb 32 are now reflected outwardly through said opening and, when the device is held properly, on to the lips of the user, so that they can be viewed in the mirror. Accordingly, the device may be used in dark or poorly lighted surroundings, with the same facility as in the daytime.

While the device as described is designed for and has special utility in properly applying lipstick, it will be understood that it may also be used as a general make-up applying device, since its mirror component may be used as the usual make-up mirror of the type usually carried in ladies' handbags and since costmetics other than or in addition to lipstick may be applied with equal facility.

It will be appreciated further that, while the barrel 10 has been shown to have generally one-piece construction, it may be made up in sections if such is deemed necessary or advisable to meet manufacturing requirements or to facilitate the assembly operation. The barrel may also have square or appropriate section other than circular, and the sleeve 23 may have means other than those illustrated for determining its two end positions and for preventing rotary movement. Moreover, the terms "right end," "right-wise," "to the right," and "left-end," "leftwise," "to the left," etc. are employed for purpose of simplified disclosure and not to limit the invention in any respect.

Accordingly, as many changes could be made in carrying out the above construction without departing from the scope of the invention, it is intended that all matter contained in the above description or shown in the accompanying drawings shall be interpreted as illustrative and not in a limiting sense.

This application is a substitute for our prior application Serial No. 135,248, filed December 27, 1949, which has become abandoned.

We claim:

1. In a vanity appliance of the character described, a tubular barrel, a dry-cell contained within the barrel adjacent one end thereof, a lamp bulb contained within the barrel and being disposed in axial alignment with but normally spaced from the positive terminal of the dry-cell, the other end of the barrel providing a compartment for a cosmetic holder, the barrel being cut away intermediate its ends to provide an opening through its side wall, a mirror mounted externally on the barrel in position to receive light rays from a subject in front of said opening, a reflector contained in the barrel and disposed so as to direct light rays from the lamp radially outwardly through said opening on to said subject, means conductively communicating the lamp bulb with the negative terminal of the dry-cell, and means mounted externally of said barrel for covering and uncovering said opening and for effecting axial movement of the lamp bulb into and out of closed circuit relation to the dry-cell.

2. In a vanity appliance of the character described, a tubular barrel, a stationary dry-cell and a coaxially related and axially movable lamp bulb operatively disposed in normally open supply circuit relationship at one end of the barrel, means conductively communicating the lamp bulb in closed returned circuit relationship with the dry-cell, the other end of the barrel providing a compartment for a cosmetic holder, the barrel being cut away intermediate its ends to provide an opening through its side wall, a mirror mounted externally on the barrel in position to receive light rays from a subject in front of said opening, a reflector contained in the barrel and disposed so as to direct light rays from the lamp radially outwardly through said opening onto said subject, a sleeve slidably mounted on said barrel and having a normal position in which its covers said opening, said sleeve being movable axially of the barrel to expose said opening, and means responsive to axial movement of the sleeve for imparting axial movement to the lamp bulb in a direction as to complete said lamp circuit.

3. In a vanity appliance of the character described, a tubular barrel, a stationary dry-cell and a coaxially related and axially movable lamp bulb operatively disposed in normally open circuit relationship at one end of the barrel, the other end of the barrel providing a compartment for a cosmetic holder, the barrel being cut away intermediate its ends to provide an opening through its side wall, a mirror mounted externally on the barrel in position to receive light rays from a subject in front of said opening, a reflector contained in the barrel and disposed so as to direct light rays from the lamp radially outwardly through said opening onto said subject, a sleeve in conductive communication between the lamp bulb and the dry-cell and being slidably mounted on said barrel for movement in opposite directions to and from end positions, means supporting the lamp bulb from the sleeve for axial movement therewith, the sleeve in one of its end positions closing said opening and in its other position being operative both to expose said opening and to engage the lamp bulb with a terminal of the battery thereby to complete the lamp circuit.

4. In a vanity appliance of the character described, a tubular barrel, a dry-cell contained in and stationarily mounted at one end of the barrel, the barrel being cut away intermediate its ends to provide an opening, a sleeve slidable axially on said barrel between end positions and being operative in one end position to close said opening, a lamp bulb contained within the barrel and having conductive communication with the dry-cell through the sleeve and being affixed to the sleeve so as to partake of the axial movement of said sleeve, the sleeve in said one position spacing the bulb from the dry-cell, said sleeve being operative in its other end position to engage the bulb terminal with a terminal of the dry-cell, thereby to complete a circuit from dry-cell to lamp, and means contained in and disposed adjacent the other end of the barrel for directing light rays from the lamp outwardly through said opening.

5. In a vanity appliance of the character described, a tubular barrel, a dry-cell contained in and stationarily mounted at one end of the barrel, the barrel being cut away intermediate its ends to provide an opening, a sleeve slidable axially on said barrel and being operative in one position to close said opening, an arm affixed to the sleeve and depending from said opening into the barrel, a lamp bulb carried by said arm in coaxial relationship with but spaced from the dry-cell in said one position of the sleeve, said lamp bulb being in conductive communication with the battery through the sleeve and said sleeve being actuable to another position in which it effects uncovering of said opening and axial movement of the lamp bulb into engagement with the dry-cell, thereby to complete a circuit through the lamp, and a reflector contained within the barrel for directing light rays emanating from the lamp outwardly through said opening.

6. In a vanity appliance of the character described, a tubular barrel, a dry-cell contained in and stationarily mounted at one end of the barrel and having one of its terminals grounded thereto, the barrel being provided with a longitudinal opening intermediate its ends, a sleeve slidable axially on said barrel and having a normal position in which it closes said opening, said sleeve being also connected to ground and carrying an inwardly directed arm extending through said opening into the barrel, a lamp bulb carried by and grounded to said arm and being spaced coaxially from the positive terminal of the dry-cell when the sleeve is in its normal position, said sleeve being operative when shifted to an opening-uncovering position to effect axial movement of the lamp bulb to a position in which its terminal contacts said positive terminal of the dry-cell, thereby to complete a circuit through the bulb to ground, and a reflector mounted in the barrel and operative to direct light rays emanating from the bulb outwardly through said opening.

7. In a vanity appliance of the character described, a tubular barrel, a dry-cell and a lamp bulb operatively disposed in normally open circuit relationship at one end of the barrel, the other end of the barrel providing a compartment for a cosmetic holder, the barrel being cut away intermediate its ends to provide an opening through its side wall, a mirror mounted externally on the barrel in position to receive light rays from a subject in front of said opening, a reflector contained in the barrel and disposed so as to direct light rays from the lamp radially outwardly through said opening onto said subject, a sleeve slidably mounted on said barrel and having a normal position in which it covers said opening, said sleeve carrying said mirror and being movable axially of the barrel to expose said opening, and means responsive to such axial movement of the sleeve for completing said lamp circuit.

8. In a vanity appliance of the character described, a tubular barrel, a dry-cell and a lamp bulb operatively disposed in normally open circuit relationship at one end of the barrel, the other end of the barrel providing a compartment for a cosmetic holder, the barrel being cut away intermediate its ends to provide an opening through its side wall, a mirror mounted externally on the barrel in position to receive light rays from a subject in front of said opening, a reflector contained in the barrel and disposed so as to direct light rays from the lamp radially outwardly through said opening onto said subject, a sleeve slidably mounted on said barrel for movement in opposite directions to and from end positions, the sleeve in one of its end positions closing said opening and in its other position being operative to expose said opening, and means responsive to movement of said sleeve to its said other end position for completing the lamp circuit, said mirror being affixed to the sleeve for movement therewith.

References Cited in the file of this patent

UNITED STATES PATENTS

| | | |
|---|---|---|
| 1,144,201 | Hipwell et al. | June 22, 1915 |
| 2,224,259 | Florman | Dec. 10, 1940 |
| 2,258,540 | Cressaty | Oct. 7, 1941 |
| 2,258,542 | Cressaty | Oct. 7, 1941 |
| 2,296,112 | Menn | Sept. 15, 1942 |
| 2,580,258 | Tarasuk | Dec. 25, 1951 |

FOREIGN PATENTS

| | | |
|---|---|---|
| 495,103 | Great Britain | 1938 |